(12) United States Patent
Meiners et al.

(10) Patent No.: US 6,583,379 B1
(45) Date of Patent: Jun. 24, 2003

(54) PROCESS CHAMBER FOR SELECTIVE LASER FUSION

(75) Inventors: Wilhelm Meiners, Aachen (DE); Konrad Wissenbach, Herzogenrath (DE); Andres Gasser, Aachen (DE)

(73) Assignee: Fraunhofer-Gesellschaft zur Förderung der Angewandten Forschung E.V., München (DE)

( * ) Notice: Subject to any disclaimer, the term of this patent is extended or adjusted under 35 U.S.C. 154(b) by 0 days.

(21) Appl. No.: 09/856,533
(22) PCT Filed: Nov. 16, 1999
(86) PCT No.: PCT/DE99/03670
§ 371 (c)(1), (2), (4) Date: Aug. 2, 2001
(87) PCT Pub. No.: WO00/30789
PCT Pub. Date: Jun. 2, 2000

(30) Foreign Application Priority Data

Nov. 23, 1998 (DE) .......................... 198 53 947

(51) Int. Cl.⁷ .......................... B23K 26/12; B23K 26/16
(52) U.S. Cl. .............................. 219/121.6; 219/121.65; 425/174.4
(58) Field of Search ............................... 425/78, 174.4; 219/121.6, 121.65

(56) References Cited

U.S. PATENT DOCUMENTS

| | | | |
|---|---|---|---|
| 4,534,191 A | * | 8/1985 | Rogers et al. ............... 70/116 |
| 5,837,960 A | | 11/1998 | Barbe et al. |
| 5,876,767 A | | 3/1999 | Mattes et al. |
| 6,180,186 B1 | * | 1/2001 | Choy et al. ............... 427/510 |
| 6,215,093 B1 | * | 4/2001 | Meiners et al. ......... 219/121.61 |

FOREIGN PATENT DOCUMENTS

| | | | |
|---|---|---|---|
| DE | 196 49 865 | | 2/1998 |
| DE | 19649865 A | | 2/1998 |
| EP | 0 289 116 | | 11/1988 |
| EP | 0-289116 A | | 11/1988 |
| WO | WO 97/06918 | | 2/1997 |
| WO | WO 98/24574 | * | 6/1998 ........... B22F/3/105 |

OTHER PUBLICATIONS van Maaren et al., "A high vacuum system for laser induced deposition of tungsten" Journal of Vacuum Science & Technology, B–9(1) Jan./Feb. 1991., No. 1, American Vacuum Society.

A J Marren et al. "A High Vacuum System For Laser Induced Deposition Of Tungsten", *Journal of Vacuum Science and Technology: Part B*, US, American Institute of Physics. vol. 9, No. 1.

* cited by examiner

Primary Examiner—Daniel J. Jenkins
(74) Attorney, Agent, or Firm—Venable LLP; Robert Kinberg

(57) ABSTRACT

The invention relates to a process chamber for the selective laser fusion of material powder for the production of moulded parts. The process chamber consists of a closed chamber (1) having a bottom area, side walls and a cover area (6), a reservoir volume (3) and a production volume (2) in said bottom area, and first inlet and outlet openings (7, 9) for a protective gas. In the cover area (6), above the production volume (2), a raised region is provided with side areas, in which a beam injection window (10) is disposed that is transparent to laser radiation to be coupled in. Second inlet openings (13) are provided for a further gas in the side areas of the raised region. With the inventive design of the process chamber it is possible to protect the beam injection window (10) efficiently from being soiled by gaseous components rising from the zone of interaction, without impairment of the efficiency in guiding the protective gas.

7 Claims, 2 Drawing Sheets

PROCESS CHAMBER FOR SELECTIVE LASER FUSION

BACKGROUND OF THE INVENTION

The present invention relates to a process chamber for selective laser fusion of material powders for the production of moulded parts such as prototypes of components.

The present invention relates in particular to a technology known by the term "rapid prototyping". Rapid prototyping methods are applied in product development for shortening the product development period and for improvement of the product quality. This becomes possible due to the possibility to manufacture prototypes from the 3D CAD model directly and very quickly by application of the rapid prototyping method. The time-consuming creation of an NC programme for milling or erosive machining or the production of shaping tools is not required, which had so far been necessary.

The development of new or the improvement of existing rapid prototyping methods aims at the possibility to process materials as close as possible to or even identical with the materials of the production series. This applies mainly to metal prototypes or prototype tools. A known method of selective laser fusion permits the production of components from commercially available steels. Like in all rapid prototyping methods, the components are produced in layers. To this end the material is applied in powder form as respective thin layer on a production platform. Using a laser beam, the powder is locally applied by fusion in correspondence with the component geometry of the layer to be produced. The components produced from steel (e.g. high-quality steel 1.4404) with this method comply with the required materials specifications in terms of their density and strength. They can hence be employed as function prototypes or directly as finished components.

Another well-known rapid prototyping method for the production of metal components from a pulverulent material is the so-called selective laser sintering. This method is applied to produce a metal component by locally processing each powder layer with a laser beam as well. As a matter of fact, however, special multi-component powder systems are employed in this method. In the processing operation merely one component of the powder system is applied by fusion rather than completely fusing the entire powder. This component serves as binding agent for the component remaining in the solid phase. In this method metals having a low fusing point are admixed, for instance, as binding components or used as metal enclosed by a synthetic material that serves as binding agent.

The disadvantage of the installations used in this method resides, however, in the fact that a commercially available mono-component powder material such as high-grade steel 1.4404 cannot be processed, particularly as a result of the shape of the process chamber, in a way that a component can be produced whose density is higher than 98%.

The German Patent DE 196 49 865 C1 proposes a method in which a metal material powder free of binding agent and flux is applied on the production platform and heated by the laser beam appropriately to the fusing temperature in correspondence with the component geometry. The laser beam energy is so selected that the metal material powder will be completely applied by fusion at the point of incidence of the laser beam throughout the entire density of the layer. In this method, the laser beam guided over the predetermined region of the respective material layer in several tracks such that each following track of the laser beam will partly overlap the preceding track. At the same time, a protective-gas atmosphere is maintained over each zone of interaction between the laser beam and the metal material powder in order to avoid faults possibly created by oxidation.

The associated installation comprises there a flat square process chamber presenting a protective-gas inlet disposed in the region of the upper side edge of the process chamber, as well as a protective-gas outlet on the opposite edge, which is disposed in the region of the bottom area of the process chamber. A reservoir charged with metal material powder as well as a production chamber are provided in the bottom area of the process chamber. Both spaces comprise each a raising table driven via a lifting piston. A scanning means is provided above the process chamber in the region of the production chamber, which directs a laser beam generated by a laser device onto the raising table including the production platform. In that installation the laser beam is coupled in by a beam injection window designed as transparent area in the upper side of the process chamber.

The design of the process chamber is of decisive importance for the production of the components. With the afore-described process chamber problems are created by soiling of the transparent area, which results in losses in laser radiation coupling. This soiling results mainly from material that is evaporated when the laser beam hits on the machining surface and that deposits on the transparent area.

SUMMARY OF THE INVENTION

The problem of the present invention consists in proposing a process chamber in which it becomes possible to produce components of high density without soiling of the beam injection window even over a rather long production period.

This problem is solved with a process chamber for selective laser fusion of material powders, comprising: a closed chamber having a bottom area, side walls, and a cover area; a reservoir volume and a production volume, which are disposed underneath the bottom area; first inlet and outlet openings for a first gas, which are disposed in the region of the side walls; a beam injection window transparent to laser radiation to be coupled in; a raised region with side disposed in the cover area above the production volume, in which raised region the beam injection window is disposed; and second inlet openings for a second gas in the side areas of the raised region.

The use of a process chamber is highly important fort he production of high-density components.

The inventive process chamber is a closed chamber having a bottom area, side walls and a covering area, a reservoir volume and a production volume, which are both provided in the bottom area, as well as first inlet and outlet openings provided for a protective gas in the region of the side walls and a beam injection window transparent to the laser radiation to be coupled in. The special feature of the process chamber consists in the provision that a raised region with side walls is provided in the covering area above the production volume, in which region the beam injection window is disposed, with second inlet openings for a second gas being provided in the lateral areas of the raised region.

When the process chamber is operated for selective laser fusion a second gas is introduced through the second inlet openings, which second gas has a density lower than that of the protective gas introduced through the first inlet openings. As a result, some kind of buffer volume of the lighter second gas is formed within the raised region, through which the vapours created in the processing zone are efficiently kept away from the beam injection window. At the same time, the protective-gas flow over the processing area, that is required for the production of high-density components, is not affected by this provision.

The inventive design of the process chamber therefore permits the processing of commercially available mono-component powder materials in correspondence with the principle of selective laser fusion for the production of components whose density is higher than 98%.

To avoid oxidation of the fused metal by the oxygen in the air it is necessary to maintain an inert protective-gas atmosphere in the zone of interaction. Argon, for instance, may be used as protective gas. To this end the process should be carried out in a closed chamber in which a protective-gas atmosphere can be generated.

At the same time it is necessary that the gas flows over the zone of interaction so that gaseous components rising from the zone of interaction can be immediately seized and carried off by the gas flow. Moreover, the beam injection window, through which the laser radiation enters into the closed process chamber, must be protected from being soiled by the rising gaseous components. These requirements are satisfied by the inventive design of the process chamber.

The inventive design of the process chamber hence permits the efficient protection of the beam injection window from being soiled by gaseous components rising from the zone of interaction, without impairment of the efficiency in guiding the protective gas, which is particularly important for the process. As a result components can be successfully produced with a density better than 98% by complete fusion application of commercially available metal powders by means of a laser beam.

BRIEF DESCRIPTION OF THE DRAWINGS

The invention will be explained again in the following with reference to the embodiment in combination with the drawings wherein.

DESCRIPTION OF THE PREFERRED EMBODIMENT

Figure 1:
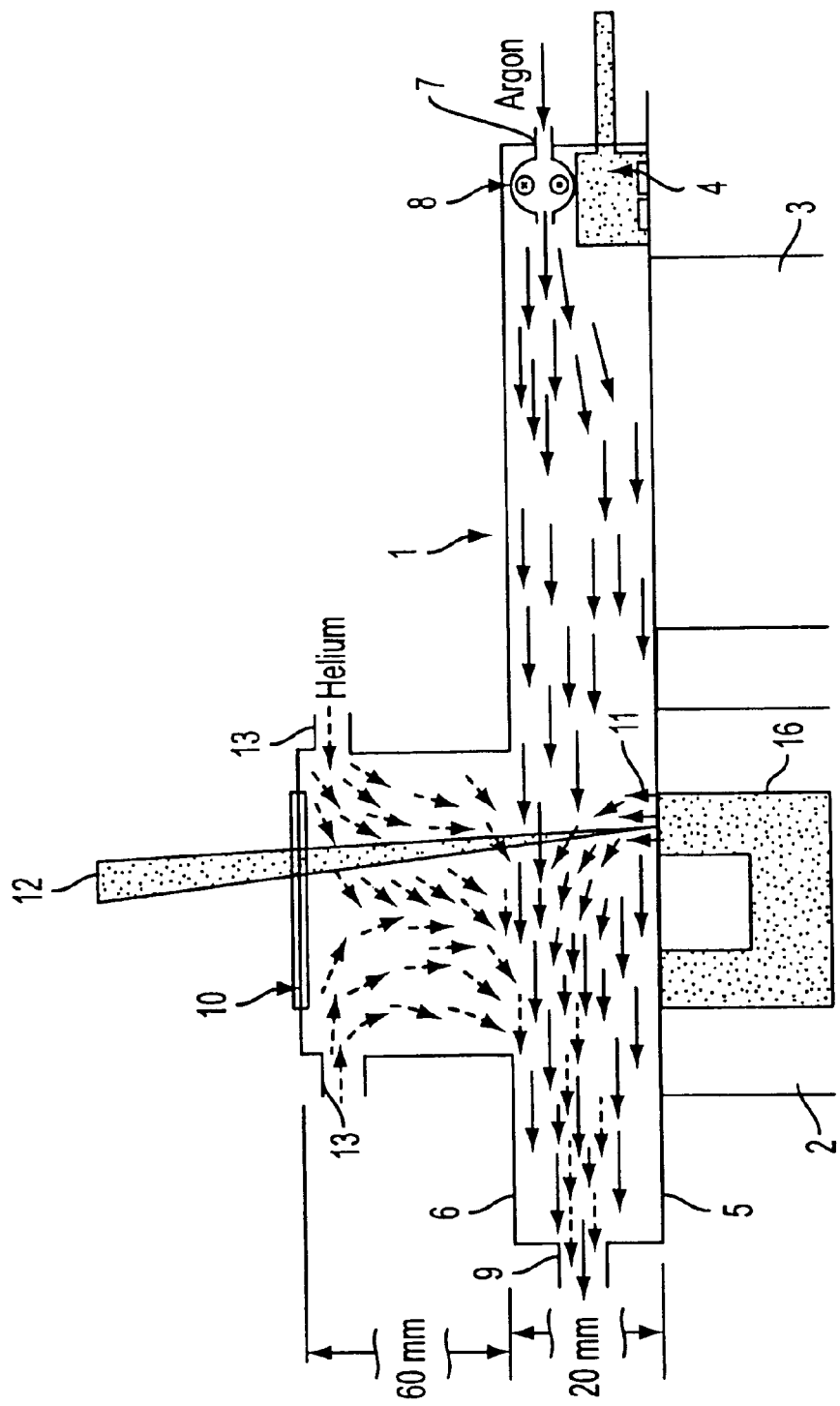
FIG. 1 is a schematic side view of an example of the design of the inventive process chamber.

In the present embodiment according to FIG. 1, the process chamber 1 consists of two cylinders, i.e. the production cylinder 2 and the powder reservoir cylinder 3. The piston of the production cylinder 2 (with the component 16) is lowered by the thickness of the corresponding layer for coating the production volume with a new powder layer while the piston of the powder reservoir cylinder 3 is raised by 1.5 times the distance, approximately.

A slide 4 is used as levelling system, which pushes the powder (not illustrated) in a linear movement from the powder cylinder 3 onto the production cylinder 2.

The process chamber 1 is a closed design and a protective gas flows therethrough (long arrows). The process chamber is given a very flat design in order to achieve an efficient flow of the protective gas in the processing zone. The spacing between the production plane 5 and the chamber cover 6 is as short as 20 mm in the present example. This becomes possible due to the fact that the driving means for the slide 4 is mounted outside the process chamber. The movement of the driving means is transferred via rods guided through the side wall of the chamber onto the slide. The slide is guided on both sides on flat steel rails inside the chamber. The sliding elements mounted on the slide are made of Teflon. The height of the slide amounts to 10 mm. The slide is made of a non-magnetic material in order to avoid adherence of magnetic powder materials.

The inlet 7 for admission of the protective gas is provided above the slide 4, and the gas flows in via a distributor 8 over the entire width of the chamber. The distributor 8 is a tube having a circular cross-section. Small holes spaced by 10 mm are provided on that side of the tube which faces the interior of the chamber. The diameter of the holes is so designed that the sum of the cross-sectional areas of the holes equals the cross-sectional area of the tube. This provision ensures that the gas flowing into the distributor tube will flow into the process chamber in a homogeneous distribution through all the small holes.

The outlet openings 9 for discharge of the protective gas are provided on the opposite side of the chamber. The protective gas flows hence in a duct at a level of 20 mm above the processing plane, as is roughly indicated by the long arrows in FIG. 1.

The chamber cover 6 is provided with a beam injection window 10 transparent to the laser radiation in the region of the construction cylinder 2. The beam injection window 10 is spaced from the construction plane 5 by a wider distance because it must be protected from being soiled by vapours 11 (short continuous arrows) and splashes occurring during the processing operation with the laser beam 12. For this reason the chamber cover 6 is raised by 60 mm in the region of the beam injection window 10 in the present embodiment. In order to maintain yet the flow of the protective gas in this zone a second gas flow (roughly indicated by dotted arrows) is circularly introduced into the chamber 1 directly below the beam injection window 10 through inlet openings 13. The gas flowing in from the top presents a lower density than the gas introduced laterally. The lighter-weight gas fills the raised region of the chamber. As a result, both the vapours and the heavier protective gas remain in the lower zone of the chamber, as is roughly indicated by the orientation of the respective arrows in the Figure. Hence, not only the beam injection window 10 is protected from being soiled but also a flat flow duct is maintained for the protective gas supplied from the side.

The beam injection window or the cross-section of the raised zone may have a plurality of shapes in the inventive process chamber, for instance a round, rectangular or polygonal shape.

When the processed material is steel argon is supplied, for instance, at a volumetric flow of roughly 15 liters/minute while helium is introduced from the top at a rate of 10 liters/minute. With such an arrangement the window 10 is protected from being soiled even in a production process lasting for several hours, whilst at the same time the effect of the protective gas flow on the processing operation is maintained.

Figure 2:
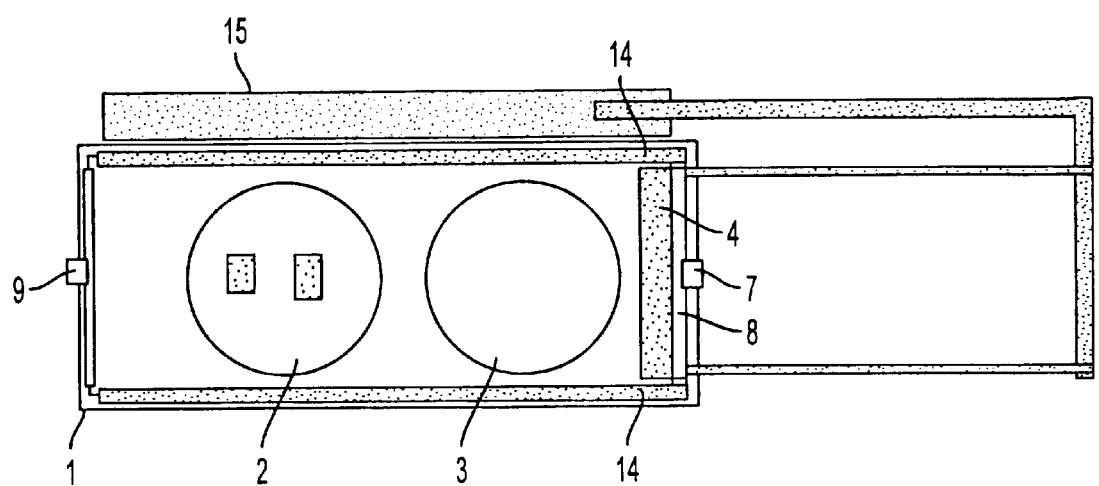
FIG. 2 is a plan view of the process chamber illustrated in FIG. 1.

FIG. 2 finally shows the entire installation again, however in a plan view. In this figure one can clearly recognise not only the construction cylinder 2, the powder reservoir cylinder 3, the gas inlet 7, the distributor 8 and the gas outlet 9 for the laterally supplied protective gas but mainly also the slide 4 with the associated guiding rails 14 and the slide driving means 15 mounted outside the process chamber.

What is claimed is:

1. A process chamber for selective laser fusion of material powders, comprising:

a closed chamber having a bottom area, side walls and a cover area;

a reservoir volume and a production volume, disposed underneath said bottom area;

first inlet and outlet openings for a first gas, disposed in a region of said side walls;

a raised region with side areas disposed in said cover area above said production volume;

second inlet openings for a second gas being disposed in the side areas of said raised region; and a beam injection window transparent to laser radiation to be coupled in, disposed in the raised region.

2. The process chamber according to claim 1, wherein said raised region presents a rotationally symmetric design.

3. The process chamber according to claim 2, wherein said raised region has a cylindrical shape.

4. The process chamber according to claim 1, wherein said first inlet and outlet openings are provided in said side walls, with said outlet openings being located on the side walls opposite to said inlet openings.

5. The process chamber according to claim 1, wherein the sum of the cross-sectional areas of said first inlet openings is equal to the cross-sectional areas of a feed duct for supply of said protective gas to said inlet openings.

6. A method of operating the process chamber according claim 1, comprising:

introducing a first gas as a protective gas through said first inlet openings;

introducing a second gas through said second inlet openings, said second gas having a density lower than that of said first gas.

7. The method according to claim 6, wherein helium is used as said second gas.

* * * * *